US011254998B2

United States Patent
Niinae

(10) Patent No.: US 11,254,998 B2
(45) Date of Patent: Feb. 22, 2022

(54) METHOD FOR SEPARATING DY AND TB FROM ALLOY CONTAINING BOTH

(71) Applicant: HITACHI METALS, LTD., Tokyo (JP)

(72) Inventor: Toshinobu Niinae, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 599 days.

(21) Appl. No.: 16/084,047

(22) PCT Filed: Mar. 27, 2017

(86) PCT No.: PCT/JP2017/012292
§ 371 (c)(1),
(2) Date: Oct. 30, 2018

(87) PCT Pub. No.: WO2017/170347
PCT Pub. Date: Oct. 5, 2017

(65) Prior Publication Data
US 2020/0299803 A1    Sep. 24, 2020

(30) Foreign Application Priority Data

Mar. 28, 2016  (JP) ............... JP2016-064773

(51) Int. Cl.
*C22B 59/00* (2006.01)
*C22B 7/00* (2006.01)
*B01D 53/14* (2006.01)

(52) U.S. Cl.
CPC .............. *C22B 7/001* (2013.01); *B01D 53/14* (2013.01); *C22B 59/00* (2013.01)

(58) Field of Classification Search
CPC .. B01D 53/14; B09B 3/00; B09B 5/00; C22B 59/00; C22B 7/001; C22B 9/04; Y02P 10/20
(Continued)

(56) References Cited

U.S. PATENT DOCUMENTS 5,437,709 A * 8/1995 Ellis ..................... C22B 59/00
75/581

FOREIGN PATENT DOCUMENTS

CN  101506919 A  8/2009
EP  2952594 A1  12/2015
(Continued)

OTHER PUBLICATIONS

NPL: on-line English translation of CN1243168A, Feb. 2000 (Year: 2000).*

(Continued)

*Primary Examiner* — Jie Yang
(74) *Attorney, Agent, or Firm* — Kratz, Quintos & Hanson, LLP

(57) ABSTRACT

An object of the present invention is to provide a method for separating Dy and Tb from an alloy containing Dy and Tb as constitutional metals without using a solvent extraction method. The method of the present invention as a means for resolution is characterized by comprising vaporizing Dy by subjecting the alloy to a heat treatment in an atmosphere of a pressure Pt(Pa) that, when a Dy—Tb composition in the alloy is $Dy_xTb_y$ (atomic composition ratio) and a heat treatment temperature is t, satisfies formula 1: $Pt_{Tb}<Pt<Pt_{Dy}\times(x/(x+y))$, wherein $Pt_{Dy}$ is a vapor pressure (Pa) of Dy alone at the temperature t and $Pt_{Tb}$ is a vapor pressure (Pa) of Tb alone at the temperature t.

4 Claims, 2 Drawing Sheets

(58) Field of Classification Search
USPC .......................................................... 75/414
See application file for complete search history.

(56) References Cited

FOREIGN PATENT DOCUMENTS

| | | |
|---|---|---|
| GN | 1243168 A | 2/2000 |
| GN | 104979917 A | 10/2015 |
| JP | 2013-87317 A | 5/2013 |
| JP | 2013-139617 A | 7/2013 |

OTHER PUBLICATIONS

NPL: on-line translation of CN104979917A Oct. 2015 (Year: 2015).*
European Search Report for European Patent Application No. 17774884.5 dated Oct. 8, 2019 (5 sheets).
R. Abreu, et al.; "Study on separation of heavy rare earth elements by solvent exli action with organophosphorus acids and amine reagents"; Minerals Engineering; vol. 61; 2014; pp. 82-87 (6 pages).
International Search Report for International Application No. PCT/JP2017/012292 dated Apr. 18, 2017 (2 Sheets).
Office Action of corresponding Chinese Patent Application No. 201780026665.1 dated Aug. 17, 2020 7 sheets, 7 sheets translation, 14 sheets total).
Xu, Guangxian; "Rare Earth Middle Book"; 2nd Edition; Beijing; Metallurgical Industry Press; Aug. 1995; pp. 59-63 (5 pages, 2 cover sheets, 7 pages total).
Office Action of corresponding Chinese Patent Application No. 201780026665.1 dated Mar. 1, 2021 (7 sheets).

* cited by examiner

[Fig. 1]
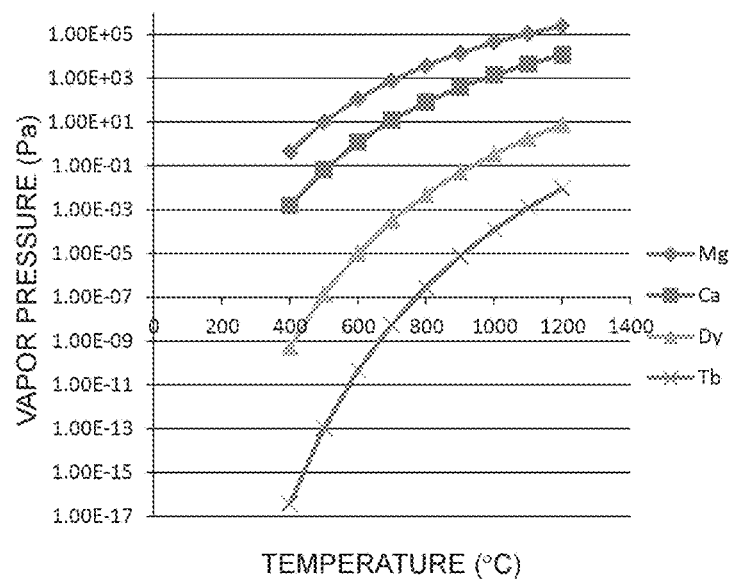
[Fig. 2]
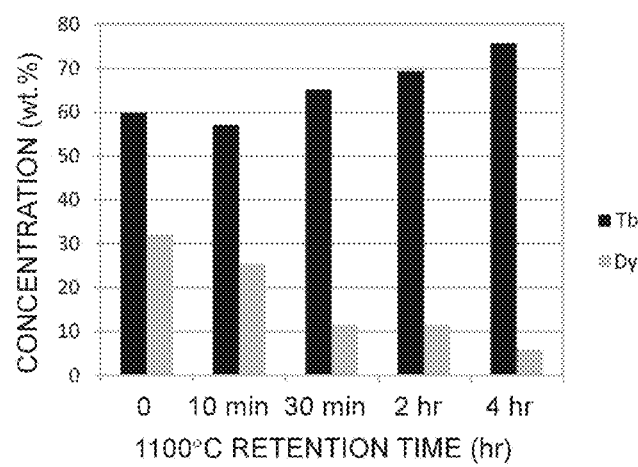

[Fig. 3]
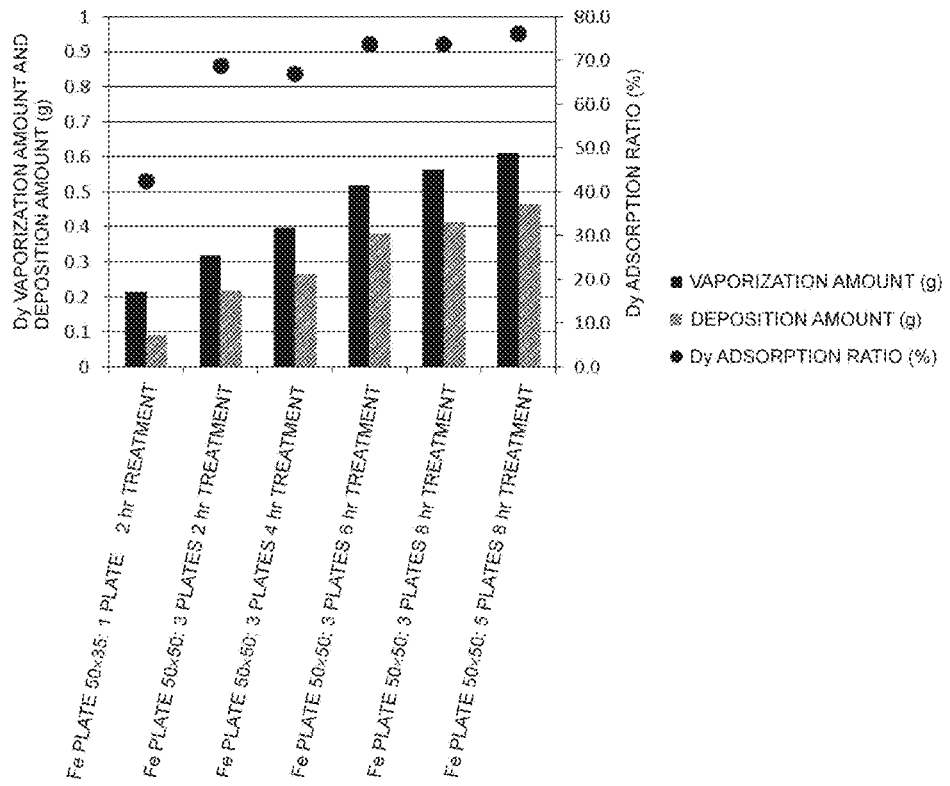
[Fig. 4]
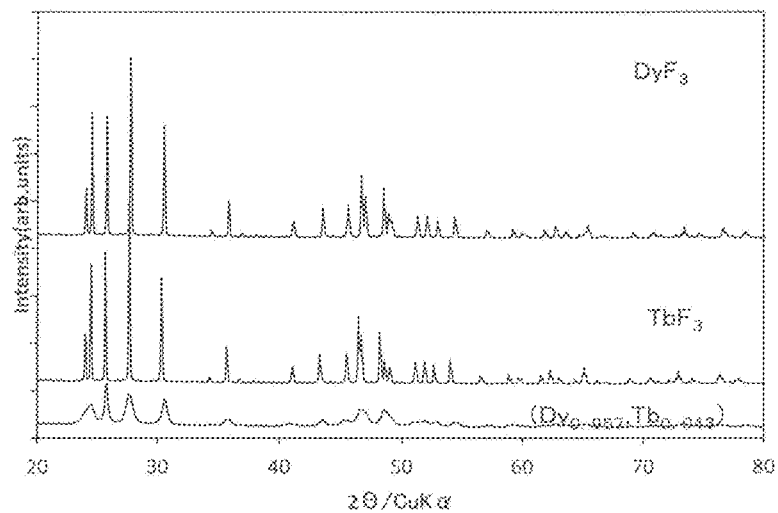

METHOD FOR SEPARATING DY AND TB FROM ALLOY CONTAINING BOTH

TECHNICAL FIELD

The present invention relates to a method for separating Dy and Tb which are heavy rare earth elements from an alloy containing Dy and Tb as constituting metals.

BACKGROUND ART

As is widely known, R—Fe—B based permanent magnets (R is a rare earth element) have high magnetic characteristics and thus are used in various fields today. Against such a background, in R—Fe—B based permanent magnet production plants, large amounts of magnets are produced every day. However, with an increase in the amount of magnets produced, the amounts of magnet scrap discharged as a defectively processed product or the like, magnet processing waste discharged as cutting waste, grinding waste, or the like, etc., during the production process have also been increasing. In particular, with the weight and size reduction of information devices, the size of magnets used therein has also been reduced, leading to an increase in the proportion of processing allowance, and, as a result, the production yield tends to decrease year by year. Accordingly, rather than discarding magnet scrap, magnet processing waste, and the like discharged during the production process, how to recover and recycle metallic elements contained therein, particularly rare earth elements, is an important technical challenge for the future. The same also applies to how to recover rare earth elements from electrical appliances in which R—Fe—B based permanent magnets are used, etc., and recycle them as recyclable resources. Thus, as a method for recovering a rare earth element from a workpiece containing a rare earth element and an iron group element, such as an R—Fe—B based permanent magnet, Patent Document 1 proposes a method including subjecting a workpiece to an oxidation treatment, then turning the treatment environment into an environment where carbon is present, and subjecting an oxidation-treated workpiece to a heat treatment at a temperature of 1150° C. or more, whereby a rare earth element is separated in the form of an oxide from an iron group element and recovered.

The method proposed in Patent Document 1 is excellent as a recycling system that is required to be low-cost and simple. However, in the case of a workpiece which is a mixture of magnet scraps or magnet processing wastes, for example, derived from R—Fe—B based permanent magnets having different compositions and contains a light rare earth element and a heavy rare earth element as rare earth elements, an oxide of the rare earth elements separated from an iron group element and recovered is generally a composite oxide or mixture of oxides of the light rare earth element and the heavy rare earth element. The composite oxide or mixture of oxides of the light rare earth element and the heavy rare earth element is subjected to, for example, the solvent extraction method proposed in Patent Document 2 and is thus divided into the light rare earth element ions and the heavy rare earth element ions, and the ions are then converted into the oxides or fluorides of each ion species, which are then subjected to a molten salt electrolysis method or a Ca reduction method, whereby the light rare earth metal and the heavy rare earth metal each can be recovered. In this case, when Dy and Tb are contained in a workpiece as heavy rare earth elements, the heavy rare earth metal recovered is an alloy containing Dy and Tb as constituting metals. Separation of Dy and Tb from the alloy containing Dy and Tb can be achieved by, for example, a solvent extraction method. However, the separation of Dy and Tb which are adjacent atomic numbers by a solvent extraction method needs large scale equipment and a large amount of an extractant or organic solvent.

PRIOR ART DOCUMENTS

Patent Document

Patent Document 1: WO 2013/018710
Patent Document 2: JP-A-H2-80530

SUMMARY OF THE INVENTION

Problems that the Invention is to Solve

Thus, the present invention has an object to provide a method for separating Dy and Tb from an alloy containing Dy and Tb as constituting metals without using a solvent extraction method.

Means for Solving the Problems

As a result of intensive and extensive studies in view of the above situation, the present inventor has found a method for effectively separating Dy and Tb by using the difference in the vapor pressures, that is, the fact that the vapor pressure of Dy is significantly higher than that of Tb in spite that Dy and Tb are adjacent atomic numbers.

A method for separating Dy and Tb from an alloy containing Dy and Tb as constituting metals of the present invention made on the basis of the above findings is, as described in claim 1, characterized by comprising vaporizing Dy by subjecting the alloy to a heat treatment in an atmosphere of a pressure Pt(Pa) that, when a Dy—Tb composition in the alloy is $Dy_xTb_y$ (atomic composition ratio) and a heat treatment temperature is t, satisfies formula 1: $Pt_{Tb} < Pt < Pt_{Dy} \times (x/(x+y))$, wherein $Pt_{Dy}$ is a vapor pressure (Pa) of Dy alone at the temperature t and $Pt_{Tb}$ is a vapor pressure (Pa) of Tb alone at the temperature t.

A method as described in claim 2 is the method according to claim 1 characterized in that the heat treatment temperature t is 900° C. to 1500° C.

A method as described in claim 3 is the method according to claim 1 characterized in that Dy is vaporized from the alloy until x/(x+y) becomes 0.1 or less.

A method as described in claim 4 is the method according to claim 1 characterized in that the vaporized Dy is solidified using a cooling means.

A method as described in claim 5 is the method according to claim 1 characterized in that the vaporized Dy is captured in a getter.

A method as described in claim 6 is the method according to claim 5 characterized in that a material of the getter is Fe.

A method as described in claim 7 is the method according to claim 1 characterized in that each of Dy and Tb contained in the alloy is derived from an R—Fe—B based permanent magnet.

Effect of the Invention

The present invention can provide a method for separating Dy and Tb from an alloy containing Dy and Tb as constituting metals without using a solvent extraction method.

BRIEF DESCRIPTION OF THE DRAWINGS

FIG. 1 illustrates vapor pressure curves of metals Mg, Ca, Dy, and Tb.

FIG. 2 is a graph illustrating a relationship between the heat treatment time and the Dy concentration and the Tb concentration in a sample after the heat treatment in Example 2.

FIG. 3 is a graph illustrating a difference inefficiency as a getter on Dy vaporized from a sample by the difference in the number of Fe plates as the getter and the heat treatment time in Example 3.

FIG. 4 illustrates XRD peak patterns of fluorides of Dy and Tb obtained in Step 4 for preparing a Dy-and-Tb-containing alloy to be a sample in Example 5.

MODE FOR CARRYING OUT THE INVENTION

The method for separating Dy and Tb from an alloy containing Dy and Tb as constituting metals of the present invention is characterized by comprising vaporizing Dy by subjecting the alloy to a heat treatment in an atmosphere of a pressure Pt(Pa) that, when a Dy—Tb composition in the alloy is $Dy_xTb_y$ (atomic composition ratio) and a heat treatment temperature is t, satisfies formula 1: $Pt_{Tb} < Pt < Pt_{Dy} \times (x/(x+y))$, wherein $Pt_{Dy}$ is a vapor pressure (Pa) of Dy alone at the temperature t and $Pt_{Tb}$ is a vapor pressure (Pa) of Tb alone at the temperature t.

The alloy containing Dy and Tb as constituting metals (hereinafter, abbreviated as "Dy-and-Tb-containing alloy") to which the method of the present invention can be applied is not particularly limited as long as it contains Dy and Tb which are heavy rare earth elements, and may contain, as other elements, light rare earth elements, such as Nd and Pr, iron group elements, such as Fe, Co, and Ni, boron, and the like. However, in the Dy-and-Tb-containing alloy, the sum of the Dy content and the Tb content is preferably 90 mass % or more, and more preferably 95 mass % or more. The total content of light rare earth elements, iron group elements, boron, and the like is preferably 5.0 mass % or less, and more preferably 2.5 mass % or less.

Specific examples of Dy-and-Tb-containing alloys include an alloy derived from a mixture of an R—Fe—B based permanent magnet that contains Nd or Pr as a light rare earth element and Dy as a heavy rare earth element and an R—Fe—B based permanent magnet that contains Nd or Pr as a light rare earth element and Tb as a heavy rare earth element. Such a Dy-and-Tb-containing alloy derived from a mixture of magnets can be obtained by, for example, producing a composite oxide or mixture of oxides of the light rare earth elements and the heavy rare earth elements from a mixture of magnets by the method proposed in Patent Document 1, then subjecting the obtained composite oxide or mixture of oxides of the light rare earth elements and the heavy rare earth elements to the solvent extraction method proposed in Patent Document 2 to separate the light rare earth element ions and the heavy rare earth element ions, then converting the heavy rare earth element ions separated from the light rare earth element ions into the oxides or fluorides of the heavy rare earth elements, and subjecting the oxides or fluorides to a molten salt electrolysis method or a Ca reduction method.

As described above, a Dy-and-Tb-containing alloy can be obtained by converting heavy rare earth element ions containing Dy ions and Tb ions (hereinafter abbreviated as "Dy-and-Tb-containing ions") into the oxides or fluorides of Dy and Tb, and subjecting the oxides or fluorides to a molten salt electrolysis method or a Ca reduction method. In particular, a method in which the Dy-and-Tb-containing ions are converted into the fluorides of Dy and Tb, which are then subjected to a Ca reduction method is suitably used. When a method in which the Dy-and-Tb-containing ions are converted into the oxides of Dy and Tb, which are then subjected to a molten salt electrolysis method is used, the oxide of Dy is likely to be reduced but the oxide of Tb is less likely to be reduced. When a method in which the Dy-and-Tb-containing ions are converted into the fluorides of Dy and Tb, which are then subjected to a molten salt electrolysis method is used, a countermeasure against a problem of an electrolysis reaction generating fluorine gas is needed, and in addition, a large amount of the fluorides of Dy and Tb has to be charged as molten salts, leading to a high cost. When a method in which the Dy-and-Tb-containing ions are converted into the fluorides of Dy and Tb, which are then subjected to a Ca reduction method is used, a metal that forms an alloy with Dy and Tb to decrease the melting point of the alloy is preferably used since a melt is not produced in a Ca reduction at 1300° C. or lower due to high melting points of the metal Dy and the metal Tb and separation of the metals from a $CaF_2$ slug produced through the Ca reduction is therefore difficult. However, in the Ca reduction method, it is not desirable to use Fe which is commonly used for decreasing a melting point of an alloy. This is because Dy is unlikely to vaporize when Fe coexists in the Dy-and-Tb-containing alloy to be applied to the method of the present invention. Thus, in a method in which the Dy-and-Tb-containing ions are converted into the fluorides of Dy and Tb, which are then subjected to a Ca reduction method, Mg or Zn is preferably used as a metal that forms an alloy with Dy and Tb to decrease the melting point of the alloy. This is because Mg and Zn, which form an intermetallic compound having a melting point of 1000° C. or lower with Dy or Tb and in addition have high vapor pressures, can be easily removed by distillation if coexisting in the Dy-and-Tb-containing alloy to be applied to the method of the present invention. A specific example of a method of using Mg in the method in which the Dy-and-Tb-containing ions are converted into the fluorides of Dy and Tb, which are then subjected to a Ca reduction method is as follows. First, the Dy-and-Tb-containing ions are converted into the fluorides of Dy and Tb via the oxides of Dy and Tb, or are directly converted into the fluorides of Dy and Tb. Ca and Mg are added to the obtained fluorides of Dy and Tb, and the mixture is subjected to a heat treatment at 1000° C. to 1100° C. for 30 minutes to 24 hours under argon stream to perform Ca reduction. The amount of Mg added based on the total amount of Dy and Tb is preferably such an amount that the value calculated by the following formula: $(Mg/(Mg+Dy \text{ and } Tb)) \times 100$ by mole is 30% to 70%. When the value is less than 30%, the melting point of the alloy is 1100° C. or higher, and Mg is difficult to remove by distillation from the alloy. Meanwhile, when the value exceeds 70%, a large amount of Mg has to be removed by distillation from the alloy. For example, $CaCl_2$ may be added for decreasing the melting point of a $CaF_2$ slug produced through the Ca reduction to thereby efficiently separate the Dy-and-Tb-containing alloy and the $CaF_2$ slug. $CaCl_2$ is a suitable flux that can decrease the melting point of a $CaF_2$ slug without any adverse effect on the Ca reduction. The amount of $CaCl_2$ added based on the calculated $CaF_2$ production amount is preferably such an amount that the value calculated by the following formula: $(CaCl_2/(CaCl_2+CaF_2)) \times 100$ by mole is 40% to 80%. When the value is less than 40%, there is a risk that $CaCl_2$ does not sufficiently function as a flux. Meanwhile, when the value exceeds 80%, it simply leads to increased cost without improving the function as a flux. From a Dy-and-Tb-containing alloy containing Ca and Mg obtained by such a method, Mg and Ca are removed by distillation on the basis of the vapor pressure curves of the respective metals (see FIG. 1). When a Dy-and-Tb-containing alloy containing Ca and Mg is subjected to a heat treatment under a reduced pressure of $10^{-2}$ Pa to 100 Pa at 800° C. to 1000° C. for 1 hour to 48 hours with a heat treatment furnace equipped with a heating unit and a cooling unit that captures the vapor of Mg and Ca and recovers them to thereby remove Ca and Mg by distillation, 98% or more of Dy and Tb contained in the fluorides of Dy and Tb are reduced and a Dy-and-Tb-containing alloy can be produced in a sponge form. The thus obtained sponge-form Dy-and-Tb-containing alloy may be applied to the method of the present invention as it is, or may be melted in an arc melting furnace or the like and processed into a form of an ingot, a cast slab, a foil, or the like before applied to the method of the present invention. In a method in which the Dy-and-Tb-containing ions are converted into the fluorides of Dy and Tb, which are then subjected to a Ca reduction method, a method of using Zn may follow the method of using Mg.

In the method of the present invention, in short, a Dy-and-Tb-containing alloy is subjected to a heat treatment in an atmosphere of a pressure where Dy vaporizes but Tb does not vaporize to thereby vaporize only Dy. Since Dy and Tb are complete solid solution type metals and does not form an intermetallic compound, and in addition, the vapor pressure of Dy is significantly higher than that of Tb, the present inventor has found a treatment condition where Dy vaporizes but Tb does not vaporize for vaporizing only Dy from a Dy-and-Tb-containing alloy. Here, the heat treatment temperature is preferably 900° C. to 1500° C. When the heat treatment temperature is lower than 900° C., it is difficult to provide a high vacuum pressure environment for vaporizing Dy. On the other hand, when the heat treatment temperature is higher than 1500° C., Tb is likely to vaporize and separation of Dy and Tb becomes difficult. The heat treatment temperature is preferably 1000° C. to 1300° C.

As the pressure where Dy vaporizes but Tb does not vaporize from a Dy-and-Tb-containing alloy, the method of the present invention employs a pressure Pt(Pa) that, when a Dy—Tb composition in the alloy is $Dy_xTb_y$ (atomic composition ratio) and a heat treatment temperature is t, satisfies formula 1: $Pt_{Tb} < Pt < Pt_{Dy} \times (x/(x+y))$, wherein $Pt_{Dy}$ is a vapor pressure (Pa) of Dy alone at the temperature t and $Pt_{Tb}$ is a vapor pressure (Pa) of Tb alone at the temperature t. When the pressure Pt is set to be larger than the vapor pressure of Tb alone, $Pt_{Tb}$, and smaller than the Dy vapor pressure of $Dy_xTb_y$, $Pt_{Dy} \times (x/(x+y))$, only Dy can vaporize from the alloy. For example, in the case where the Dy—Tb composition in the alloy to be treated is $DyTb_2$ (x=1, y=2), the pressure Pt at the beginning of the treatment is in the range of $8.0 \times 10^{-6}$ Pa to 0.05 Pa in a heat treatment at 900° C. and in the range of 1.1 Pa to 200 Pa in a heat treatment at 1500° C. When only Dy vaporizes from the alloy, x gradually decreases, and thus $Pt_{Dy} \times (x/(x+y))$ also gradually decreases so that the range of the pressure Pt that can be employed becomes narrow. Accordingly, the pressure Pt may be gradually varied with the time so as to become smaller. Alternatively with a degree at which only Dy vaporizes from the alloy, for example, a degree: $x/(x+y) \leq 0.1$, set as a goal, a pressure Pt that is sufficient to achieve the goal may be maintained with no change from the beginning of the treatment until the goal is achieved. For example, when a Dy—Tb composition in the alloy to be treated is $DyTb_2$, with $x/(x+y) \leq 0.1$ set as a goal, and a pressure Pt is maintained with no change from the beginning of the treatment until the goal is achieved, the pressure Pt is in the range of $8.0 \times 10^{-6}$ Pa to 0.005 Pa in a heat treatment at 900° C. and in the range of 1.1 Pa to 20 Pa in a heat treatment at 1500° C. Since $Pt_{Dy}$ is higher by two orders of magnitude than $Pt_{Tb}$, $x/(x+y) \leq 0.01$ is an achievable goal if a vacuum system having a high evacuation performance is used. Incidentally, when a Dy-and-Tb-containing alloy is subjected to a heat treatment in an atmosphere of a pressure that satisfies formula 1, Tb does not vaporize in theory, but a small amount of Tb may actually vaporize. However, as long as a Dy-and-Tb-containing alloy is subjected to a heat treatment in an atmosphere of a pressure that satisfies formula 1, such a case is included in the present invention as Tb does substantially not vaporize.

A Dy-and-Tb-containing alloy may be subjected to a heat treatment in a treatment chamber of a furnace in an atmosphere at a prescribed temperature and pressure (the treatment time depends on the target degree of the vaporization of only Dy from the alloy) by, for example, placing the alloy in a crucible or on a dish having a high heat and corrosion resistance (an example of a material of the crucible or dish is Mo). The form of the Dy-and-Tb-containing alloy is preferably a sponge form, a foil form, a particle or powder form having a particle size of 1 mm or less, or the like, since only Dy then effectively vaporizes from the alloy due to the large surface area. The crucible containing the Dy-and-Tb-containing alloy may be further placed in a container having a high heat and corrosion resistance (for example, a Mo pack) in the heat treatment. The opening of the container may be completely or partially opened or may be closed while ensuring communication with the exterior so that the diffusion velocity of Dy vaporized into the treatment chamber of the furnace can be controlled.

Dy vaporized from the Dy-and-Tb-containing alloy can be recovered by being solidified using a cooling means. If only Dy vaporizes from the alloy, the Tb purity in the alloy increases. Recovering the Dy vaporized from the alloy is important not only for recycling Dy which has been contained in the alloy, but also for keeping the pressure in the treatment chamber of the furnace at the pressure Pt. When Dy vaporized from the alloy is not recovered, the vaporized Dy remains in the treatment chamber, and as a result, the pressure in the treatment chamber becomes the pressure that the vapor pressure of the vaporized Dy is added to the pressure Pt, and acts to prevent Dy from vaporizing. Dy vaporized from a Dy-and-Tb-containing alloy can be recovered by, for example, subjecting the alloy to a heat treatment in the vicinity of one end of a treatment chamber in a tubular furnace, while providing an evacuation means, such as a rotary pump, at the other end, and cooling the vicinity by water from the exterior or the like, to thereby solidify the vaporized Dy (see, for example, JP-A-2001-303149 as needed). In this case, the temperature and pressure which are employed in a heat treatment of a Dy-and-Tb-containing alloy mean a temperature and pressure of a place around the alloy (that is, soaking area) (as the temperature and pressure in the treatment chamber vary by the position). The thus recovered Dy can be recycled in a desired manner after purification as required.

Dy vaporized from a Dy-and-Tb-containing alloy may be recovered by being captured in a getter. A material of the getter is preferably Fe in terms of effectively capturing the vaporized Dy. When Dy vaporized from an alloy is captured in a getter of which a material is Fe, Dy is recovered as an alloy with Fe. The form of the getter may be a plate form or the like, but a particle or powder form having a particle size of 1 mm or less is preferred since Dy can be effectively captured due to the large surface area. Depending on the place in the treatment chamber of the furnace, the form of the getter, the arrangement of the getter, and the like, the efficiency of capturing Dy in the getter and the Dy—Fe composition of the alloy can be varied. The Dy—Fe alloy may be recycled as it is as a material for producing an R—Fe—B based permanent magnet and the like. Alternatively, Dy and Fe may be separated, for example, by a solvent extraction method to recycle Dy separated from Fe in a desired manner after purification as required.

An alloy after vaporization of only Dy from a Dy-and-Tb-containing alloy may be recycled as it is as an alloy having an increased Tb purity, but the Tb purity may be further increased by further vaporizing only Dy by the method of the present invention.

EXAMPLES

Hereinafter, the present invention will be described in detail with reference to the examples. However, the present invention should not be construed as being limited to the following descriptions.

Example 1

A $DyTb_2$ alloy foil (having an atomic composition ratio (Tb/Dy) of 1.8 to 1.9 according to an EDX analysis and 1.93 according to an ICP analysis, and having a Dy concentration of 30.7 mass % and a Tb concentration of 56.3 mass % according to an EDX analysis) with a width of 2 mm to 3 mm and a thickness of 20 µm to 100 µm produced by a single roll liquid quenching method was cut into a length of 15 mm or less, and 2.05 g thereof was weighed out to prepare a sample. The sample was placed on a Mo dish of 30 mm length×30 mm width. The dish with the alloy placed thereon was placed in a Mo pack of 200 mm length×75 mm width×40 mm height, and a lid was put on the pack with a niobium foil interposed therebetween so as to seal the interior of the pack as tight as possible while ensuring communication with the exterior. Then, the sample was subjected to a heat treatment at 1100° C. and a pressure of $5.0 \times 10^{-3}$ Pa or less (a pressure Pt in formula 1 (t=1100° C.)) for 2 hours (the upper limit of the pressure Pt is 0.3 Pa and the lower limit is $1.2 \times 10^{-3}$ Pa at the beginning of the treatment in the case of the heat treatment temperature of 1100° C.) in a treatment chamber of a tubular furnace (manufactured by Koyo Thermo Systems Co., Ltd.). The environment of the heat treatment was formed by evacuating the interior of the treatment chamber until the pressure became $5.0 \times 10^{-3}$ Pa or less, then increasing the temperature at 10° C./min to 600° C., keeping the temperature at 600° C. for 1 hour, and then further increasing the temperature at 5° C./min to 1100° C. After 2 hours, the interior of the treatment chamber was furnace-cooled to room temperature under vacuum, the pressure was returned to normal pressure, and the dish with the sample placed thereon was taken out from the tubular furnace. The mass of the dish with the sample placed thereon after the heat treatment was measured. The mass was reduced by 0.14 g from the mass measured before the heat treatment. The Dy concentration and the Tb concentration in the residual sample on the dish were measured by an EDX analysis. The Dy concentration was 25.1 mass % and the Tb concentration was 65.1 mass %, and the Dy concentration decreased and the Tb concentration increased due to vaporization of Dy from the sample. It was found from the above results that Dy and Tb were able to be separated from the Dy-and-Tb-containing alloy by a heat treatment according to the method of the present invention.

Example 2

A heat treatment was performed in the same manner as in Example 1 except that a niobium foil was not interposed between the pack and the lid, and the opening of the pack was not completely closed with the lid but partially opened for preventing vaporized Dy from remaining in the Mo pack. Then, a longer heat treatment time led to a reduced mass of the sample after the heat treatment. The Dy concentration and the Tb concentration in the residual sample in the pack in cases of the heat treatment time of 10 minutes, 30 minutes, 2 hours, and 4 hours respectively were measured by an EDX analysis. The results (mass %) are shown in FIG. 2. As is clear from FIG. 2, a longer heat treatment time led to a decreased Dy concentration and an increased Tb concentration due to increase in the vaporization amount of Dy from the sample.

Example 3

A heat treatment was performed in the same manner as in Example 1 except that one or plural Fe plates of 50 mm length×35 mm width×0.2 mm thickness or Fe plates of 50 mm length×50 mm width×0.2 mm thickness were placed (in the case plural plates were placed, the plates were placed so as not to overlap) as a getter in the Mo pack, and under each condition, the Dy vaporization amount from the sample (the reduction in the sample mass after the heat treatment), the Dy deposition amount onto the Fe plate (the increase in the Fe plate mass after the heat treatment; in the case plural Fe plates were placed, the total increase of all the plates), and the Dy adsorption ratio (%) calculated by the following formula: (Dy deposition amount onto Fe plate/Dy vaporization amount from sample)×100 were determined (on the assumption that only Dy vaporized from the sample). The results are shown in FIG. 3. As is clear from FIG. 3, a larger number of the Fe plates placed in the Mo pack and a longer heat treatment time led to an increased Dy vaporization amount from the sample and an increased Dy deposition amount onto the Fe plate, and the Dy adsorption ratio of 70% or more can be achieved (when the surface composition of the Fe plate was determined by an EDX analysis, the Dy content was 25 atm % to 30 atm % whereas the Tb content was 1 atm % to 2 atm %, indicating that substantially only Dy vaporized from the sample. According to the above assumption, the Dy vaporization ratio (%) calculated by the following formula: (Dy vaporization amount from sample/amount of Dy contained in sample)×100 achieves 90%). Incidentally. although FIG. 3 does not show difference in the results by the difference in the sizes of the Fe plates, it was found from another experiment that the larger the Fe plate size, the larger the values all in the Dy vaporization amount from the sample, in the Dy deposition amount onto the Fe plate, and in the Dy adsorption ratio.

Example 4

A heat treatment was performed in the same manner as in Example 1 except that 2 g or 3 g of an electrolytic iron powder A with a bulk density of about 2.0 $g/cm^3$, a specific surface area of 0.5 $m^2/g$ to 1.0 $m^2/g$, and a particle size of 53 µm or less, or an electrolytic iron powder B with a bulk density of about 2.5 g/cm$^3$, a specific surface area of 0.094 m$^2$/g, and a particle size of 150 µm or less was weighed out as a getter, and was placed on a Mo dish of 30 mm length×30 mm width or a Mo dish of 40 mm length×40 mm width, and that one or plural dishes with the electrolytic iron powder placed thereon were placed in the Mo pack and were subjected to a heat treatment at 1100° C. for 8 hours. The Dy vaporization amount from the sample (the reduction in the sample mass after the heat treatment), the Dy deposition amount onto the electrolytic iron powder (the increase in the electrolytic iron powder mass after the heat treatment; in the case plural dishes with the electrolytic iron powder placed thereon were placed, the total increase of all the electrolytic iron powder), the Dy adsorption ratio (%) calculated by the following formula: (Dy deposition amount onto electrolytic iron powder/Dy vaporization amount from sample)×100, and the Dy vaporization ratio (%) calculated by the following formula: (Dy vaporization amount from sample/Dy amount contained in sample)×100 were determined (on the assumption that only Dy vaporized from the sample). The results of the Dy adsorption ratio and the Dy vaporization ratio are shown in Table 1. As is clear from Table 1, a larger amount of the electrolytic iron powder placed in the Mo pack, that is, a larger surface area of the getter, led to an increased Dy adsorption ratio and an increased Dy vaporization ratio, and the both can achieve 90% or more. This was supported by the fact that the Dy concentration decreased and the Tb concentration increased in comparison of the Dy concentration and the Tb concentration of the sample after the heat treatment with those of the sample before the heat treatment (see Table 1).

water for 7 days to prevent spontaneous ignition) were dehydrated by suction filtration, and then subjected to an oxidation treatment by burning treatment using a rotary kiln. Next, a mixture of the oxidation-treated magnet processing wastes was placed in a carbon crucible (made of black lead), and then subjected to a heat treatment using an electric furnace under argon gas stream at 1450° C. for 1 hour. Subsequently, heating in the furnace was stopped, and, while maintaining the argon gas atmosphere in the furnace, the carbon crucible was furnace-cooled to room temperature to thereby obtain a composite oxide or mixture of oxides of light rare earth elements (Nd, Pr) and heavy rare earth elements (Dy, Tb) as one of two masses that were present independently of but in close contact with each other.

(Step 2)

The composite oxide or mixture of oxides of the light rare earth elements and the heavy rare earth elements obtained in Step 1 was ground with a mortar and a pestle made of agate, and a powder having a particle size of less than 125 µm was obtained using a screen made of stainless steel. The obtained powder was dissolved in hydrochloric acid and the residue was filtered out to thereby obtain a hydrochloric acid solution of the light rare earth elements and the heavy rare earth elements. The obtained hydrochloric acid solution of the light rare earth elements and the heavy rare earth elements was subjected to the solvent extraction method proposed in Patent Document 2 to thereby separate the light rare earth element ions and the heavy rare earth element ions. Oxalic acid dihydrate was added to the obtained hydrochloric acid solution of the heavy rare earth elements to thereby obtain an oxalate of the heavy rare earth elements in a powder form.

TABLE 1

| | Type of electrolytic iron powder | Amount placed on one dish (total use amount) | Size of dish | Number of dishes | Dy Adsorption ratio | Dy Vaporization ratio | ICP Analysis result of residual sample (Dy: 34.7 mass %, Tb: 65.3 mass % in sample) | | |
|---|---|---|---|---|---|---|---|---|---|
| | | | | | | | Dy | Tb | Si |
| Experiment 1 | Electrolytic iron powder A | 2 g (2 g) | 30 mm × 30 mm | 1 | 50.8% | 68.9% | 13.6 mass % | 86.3 mass % | 0.08 mass % |
| Experiment 2 | Electrolytic iron powder A | 3 g (6 g) | 40 mm × 40 mm | 2 | 85.1% | 85.3% | 7.8 mass % | 92.2 mass % | 0.04 mass % |
| Experiment 3 | Electrolytic iron powder A | 3 g (9 g) | 40 mm × 40 mm | 3 | 90.4% | 91.2% | 5.1 mass % | 94.8 mass % | 0.07 mass % |
| Experiment 4 | Electrolytic iron powder A | 3 g (15 g) | 40 mm × 40 mm | 5 | 93.0% | 97.1% | not measured | not measured | not measured |
| Experiment 5 | Electrolytic iron powder B | 3 g (9 g) | 40 mm × 40 mm | 3 | 87.5% | 73.1% | not measured | not measured | not measured |
| Experiment 6 | Electrolytic iron powder B | 3 g (12 g) | 40 mm × 40 mm | 4 | 88.7% | 90.1% | not measured | not measured | not measured |
| Experiment 7 | Electrolytic iron powder B | 3 g (15 g) | 40 mm × 40 mm | 5 | 85.7% | 91.7% | not measured | not measured | not measured |

Example 5

A: Preparation of Dy-and-Tb-Containing Alloy for Use as Sample to be Applied to Method of the Present Invention An alloy was prepared using an R—Fe—B based permanent magnet containing Nd and Pr as light rare earth elements and Dy as a heavy rare earth element and an R—Fe—B based permanent magnet containing Nd and Pr as light rare earth elements and Tb as a heavy rare earth element as follows.

(Step 1)

According the method proposed in Patent Document 1, magnet processing wastes having a particle size of about 10 µm produced during each production process (stored in (Step 3)

The oxalate of the heavy rare earth elements obtained in Step 2 was placed in an alumina crucible and calcined under ambient atmosphere to thereby obtain a composite oxide or mixture of oxides of the heavy rare earth elements. The obtained composite oxide or mixture of oxides of the heavy rare earth elements contained Dy and Tb at a ratio Dy:Tb of 95.6:4.4 (atm %) (according to a fluorescent X-ray analysis).

(Step 4)

The composite oxide or mixture of oxides of Dy and Tb obtained in Step 3 was dissolved in hydrochloric acid and then hydrofluoric acid was added thereto, and the generated precipitation was filtered and dried to thereby obtain fluorides of Dy and Tb in a powder form. The obtained fluorides of Dy and Tb contained Dy and Tb at a ratio Dy:Tb of 95.7:4.3 (atm %) (according to a fluorescent X-ray analysis). The C content in the obtained fluorides of Dy and Tb was 0.01 mass %, the N content was 0.03 mass %, and the O content was 1.20 mass % (by a gas analysis). The phase relationship of the obtained fluorides of Dy and Tb was confirmed by an XRD analysis. Then, the chart had a similar peak pattern to those of $DyF_3$ and $TbF_3$ which were used as standard samples and showed a substantial single phase orthorhombus with a=6.45 Å, b=6.92 Å, and c=4.01 Å (FIG. 4).

(Step 5)

With 5.70 g of the fluorides of Dy and Tb obtained in Step 4, 1.72 g of granular metal Ca, 0.635 g of wire-cut metal Mg (corresponding to such an amount of Mg added, based on the total amount of Dy and Tb, that the value calculated by the following formula: (Mg/(Mg+Dy and Tb))×100 by mole is 50.0%), and 9.94 g of $CaCl_2$ (corresponding to such an amount of $CaCl_2$ added, based on the calculated $CaF_2$ production amount, that the value calculated by the following formula: ($CaCl_2$/($CaCl_2$+$CaF_2$))×100 by mole is 70.0%) were mixed in a glove box under argon gas atmosphere, and then the mixture was placed in a titanium crucible (outer diameter: 31 mm×inner diameter: 29 mm×height: 60 mm). In a glove box under argon gas atmosphere, the titanium crucible containing the mixture was placed in an iron crucible (outer diameter: 39 mm×inner diameter: 33 mm×height: 70 mm, material: SS400), and the iron crucible containing the titanium crucible was closed in a thread manner with an iron lid with an outer diameter of 45 mm, an inner diameter of 39 mm, and a height of 10 mm to seal the content. Incidentally, when the titanium crucible was placed in the iron crucible, the outer peripheral surface and the bottom surface of the titanium crucible were wrapped with a niobium foil to prevent melt or damage of one or both of the titanium crucible and the iron crucible due to contact of the outer surface of the former with the inner surface of the latter. The iron crucible with the interior sealed was taken out of the glove box under argon gas atmosphere, and the body and the lid were welded and then subjected to a heat treatment using an electric furnace under argon gas stream at 1100° C. for 1 hour. Subsequently, heating in the furnace was stopped, and, while maintaining the argon gas atmosphere in the furnace, the iron crucible was furnace-cooled to room temperature and was then taken out. The iron crucible was cut to take the titanium crucible out, and the content was recovered. The recovered content of the titanium crucible was a $CaF_2$ slug in an upper portion and a Ca-reduced metal in a lower portion, which were present independently of but in close contact with each other. The $CaF_2$ slug in the upper portion was easily peeled off from the Ca-reduced metal in the lower portion by application of a physical impact. Dy and Tb were not detected from the $CaF_2$ slug (according to a fluorescent X-ray analysis). The Ca-reduced metal contained Dy at 29.9 atm %, Tb at 2.1 atm %, Ca at 2.1 atm %, Mg at 55.1 atm %, and O at 6.6 atm % (according to an EDX analysis). The Ca-reduced metal was subjected to a heat treatment with a heat treatment furnace equipped with a heating unit and a cooling unit that captures the vapor of Mg and Ca and recovers them under a reduced pressure of 0.1 Pa at 1000° C. for 24 hours to remove Ca and Mg by distillation, thereby obtaining a Dy-and-Tb-containing alloy for use as a sample to be applied to the method of the present invention. The obtained Dy-and-Tb-containing alloy contained Dy and Tb at a ratio Dy:Tb of 93.3:6.7 (atm %) (according to an EDX analysis).

B: Separation of Dy and Tb by Application of Method of the Present Invention to Dy-and-Tb-Containing Alloy When a heat treatment was performed according to the same conditions as in the Experiment 4 of Example 4 with 10 g of the Dy-and-Tb-containing alloy obtained in the above method taken as a sample to be applied to the method of the present invention, the Dy adsorption ratio calculated by the following formula: (Dy deposition amount onto electrolytic iron powder/Dy vaporization amount from sample)×100 was 90% or more (on the assumption that only Dy vaporized from the sample), and the Tb concentration of the sample after the heat treatment was 90 mass % or more (according to an EDX analysis). It was found from the above results that Dy and Tb were able to be effectively separated from the Dy-and-Tb-containing alloy according to the method of the present invention.

Example 6

A Ca-reduced metal was obtained in the same manner as in Example 5 except that the amount of the metal Ca used was changed to 3.13 g in Step 5 for preparing a Dy-and-Tb-containing alloy in Example 5. The obtained Ca-reduced metal contained Dy at 30.2 atm %, Tb at 2.4 atm %, Ca at 16.4 atm %, Mg at 41.5 atm %, and O at 9.1 atm % (according to an EDX analysis). Next, a Dy-and-Tb-containing alloy for use as a sample to be applied to the method of the present invention was obtained by removing Ca and Mg by distillation from the Ca-reduced metal in the same manner as in Example 5. The obtained Dy-and-Tb-containing alloy contained Dy and Tb at a ratio Dy:Tb of 92.6:7.4 (atm %) (according to an EDX analysis). When a heat treatment was performed in the same manner as in Example 5 with 10 g of the Dy-and-Tb-containing alloy taken as a sample to be applied to the method of the present invention, the Dy adsorption ratio calculated by the following formula: (Dy deposition amount onto electrolytic iron powder/Dy vaporization amount from sample)×100 was 90% or more (on the assumption that only Dy vaporized from the sample), and the Tb concentration of the sample after the heat treatment was 90 mass % or more (according to an EDX analysis). It was found from the above results that Dy and Tb were able to be effectively separated from the Dy-and-Tb-containing alloy according to the method of the present invention.

Example 7

A Ca-reduced metal was obtained in the same manner as in Example 5 except that the amount of the metal Ca used was changed to 2.04 g, and the amount of the metal Mg used was changed to 0.270 g (corresponding to such an amount of Mg added, based on the total amount of Dy and Tb, that the value calculated by the following formula: (Mg/(Mg+Dy and Tb))×100 by mole is 30.0%) in Step 5 for preparing a Dy-and-Tb-containing alloy in Example 5. The obtained Ca-reduced metal contained Dy at 44.4 atm %, Tb at 3.2 atm %, Ca at 3.5 atm %, Mg at 28.6 atm %, and O at 10.0 atm % (according to an EDX analysis). Next, a Dy-and-Tb-containing alloy for use as a sample to be applied to the method of the present invention was obtained by removing Ca and Mg by distillation from the Ca-reduced metal in the same manner as in Example 5. The obtained Dy-and-Tb-containing alloy contained Dy and Tb at a ratio Dy:Tb of 93.3:6.7 (atm %) (according to an EDX analysis). When a heat treatment was performed in the same manner as in Example 5 with 10 g of the Dy-and-Tb-containing alloy taken as a sample to be applied to the method of the present invention, the Dy adsorption ratio calculated by the following formula: (Dy deposition amount onto electrolytic iron powder/Dy vaporization amount from sample)×100 was 90% or more (on the assumption that only Dy vaporized from the sample), and the Tb concentration of the sample after the heat treatment was 90 mass % or more (according to an EDX analysis). It was found from the above results that Dy and Tb were able to be effectively separated from the Dy-and-Tb-containing alloy according to the method of the present invention.

Example 8

A Ca-reduced metal was obtained in the same manner as in Example 5 except that the amount of the metal Mg used was changed to 0.940 g (corresponding to such an amount of Mg added, based on the total amount of Dy and Tb, that the value calculated by the following formula: (Mg/(Mg+Dy and Tb))×100 by mole is 60.0%) in Step 5 for preparing a Dy-and-Tb-containing alloy in Example 5. The obtained Ca-reduced metal contained Dy at 29.1 atm %, Tb at 1.8 atm %, Ca at 10.0 atm %, Mg at 52.0 atm %, and O at 7.1 atm % (according to an EDX analysis). Next, a Dy-and-Tb-containing alloy for use as a sample to be applied to the method of the present invention was obtained by removing Ca and Mg by distillation from the Ca-reduced metal in the same manner as in Example 5. The obtained Dy-and-Tb-containing alloy contained Dy and Tb at a ratio Dy:Tb of 94.2:5.8 (atm %) (according to an EDX analysis). When a heat treatment was performed in the same manner as in Example 5 with 10 g of the Dy-and-Tb-containing alloy taken as a sample to be applied to the method of the present invention, the Dy adsorption ratio calculated by the following formula: (Dy deposition amount onto electrolytic iron powder/Dy vaporization amount from sample)×100 was 90% or more (on the assumption that only Dy vaporized from the sample), and the Tb concentration of the sample after the heat treatment was 90 mass % or more (according to an EDX analysis). It was found from the above results that Dy and Tb were able to be effectively separated from the Dy-and-Tb-containing alloy according to the method of the present invention.

Example 9

A Ca-reduced metal was obtained in the same manner as in Example 5 except that the amount of the metal Ca used was changed to 2.04 g, the amount of the metal Mg used was changed to 0.660 g (corresponding to such an amount of Mg added, based on the total amount of Dy and Tb, that the value calculated by the following formula: (Mg/(Mg+Dy and Tb))×100 by mole is 51.0%), and the amount of $CaCl_2$ used was changed to 2.90 g (corresponding to such an amount of $CaCl_2$ added, based on the calculated $CaF_2$ production amount, that the value calculated by the following formula: ($CaCl_2$/($CaCl_2$+$CaF_2$))×100 by mole is 40.0%) in Step 5 for preparing a Dy-and-Tb-containing alloy in Example 5. The obtained Ca-reduced metal contained Dy at 28.9 atm %, Tb at 2.0 atm %, Ca at 10.5 atm %, Mg at 49.4 atm %, 0 at 9.0 atm %, and F at 0.1 atm % (according to an EDX analysis). Next, a Dy-and-Tb-containing alloy for use as a sample to be applied to the method of the present invention was obtained by removing Ca and Mg by distillation from the Ca-reduced metal in the same manner as in Example 5. The obtained Dy-and-Tb-containing alloy contained Dy and Tb at a ratio Dy:Tb of 93.5:6.5 (atm %) (according to an EDX analysis). When a heat treatment was performed in the same manner as in Example 5 with 10 g of the Dy-and-Tb-containing alloy taken as a sample to be applied to the method of the present invention, the Dy adsorption ratio calculated by the following formula: (Dy deposition amount onto electrolytic iron powder/Dy vaporization amount from sample)×100 was 90% or more (on the assumption that only Dy vaporized from the sample), and the Tb concentration of the sample after the heat treatment was 90 mass % or more (according to an EDX analysis). It was found from the above results that Dy and Tb were able to be effectively separated from the Dy-and-Tb-containing alloy according to the method of the present invention.

Reference Example 1

A heat treatment was performed for 2 hours in the same manner as in Example 1 with a $DyFe_2$ alloy cast slab taken as a workpiece in place of a $DyTb_2$ alloy foil, and the mass of the sample after the heat treatment was measured. The mass decreased by only 0.01 g from that before the heat treatment. This result means that it is difficult to separate Dy and Fe from an alloy containing Dy and Fe as constituting metals by a heat treatment, and also means that Fe is superior as a material of a getter for vaporized Dy.

INDUSTRIAL APPLICABILITY

The present invention has industrial applicability in that a method for separating Dy and Tb from a Dy-and-Tb-containing alloy without using a solvent extraction method can be provided.

The invention claimed is:

1. A method for separating Dy and Tb from an alloy containing Dy and Tb as constituting metals characterizing by comprising vaporizing Dy by subjecting the alloy to a heat treatment in an atmosphere of a pressure Pt(Pa) that, when a Dy—Tb composition in the alloy is $Dy_xTb_y$ (atomic composition ratio) and a heat treatment temperature is t, satisfies formula 1: $Pt_{Tb} < Pt < Pt_{Dy} \times (x/(x+y))$, wherein $Pt_{Dy}$ is a vapor pressure (Pa) of Dy alone at the temperature t and $Pt_{Tb}$ is a vapor pressure (Pa) of Tb alone at the temperature t;

wherein the method is characterized in that the vaporized Dy is captured in a getter, wherein a material of the getter is Fe, and wherein the form of the getter is a particle or powder form having a particle size of 1 mm or less.

2. The method according to claim 1 characterized in that the heat treatment temperature t is 900° C. to 1500° C.

3. The method according to claim 1 characterized in that Dy is vaporized from the alloy until x/(x+y) becomes 0.1 or less.

4. The method according to claim 1 characterized in that each of Dy and Tb contained in the alloy is derived from an R—Fe—B based permanent magnet.

* * * * *